United States Patent [19]

Fukui

[11] Patent Number: 5,022,362
[45] Date of Patent: Jun. 11, 1991

[54] IGNITION TIMING CONTROLLING APPARATUS FOR INTERNAL COMBUSTION ENGINE

[75] Inventor: Wataru Fukui, Himeji, Japan
[73] Assignee: Mitsubishi Denki Kabushiki Kaisha, Tokyo, Japan
[21] Appl. No.: 489,628
[22] Filed: Mar. 7, 1990
[30] Foreign Application Priority Data Mar. 8, 1989 [JP] Japan .................................. 1-53874

[51] Int. Cl.$^5$ ............................................... F02P 5/15
[52] U.S. Cl. .............................. 123/146.5 D; 123/417
[58] Field of Search ............... 123/416, 417, 146.5 D; 364/431.11, 431.04

[56] References Cited

U.S. PATENT DOCUMENTS

| 3,996,911 | 12/1976 | Canup | 364/431.04 |
| 4,009,697 | 3/1977 | Chateau | 123/416 |
| 4,500,794 | 2/1985 | Hamano et al. | 123/146.5 D |
| 4,737,914 | 4/1988 | Abe et al. | 364/431.04 |

Primary Examiner—Tony M. Argenbright
Assistant Examiner—Robert E. Mates
Attorney, Agent, or Firm—Sughrue, Mion, Zinn, Macpeak and Seas

[57] ABSTRACT

An ignition timing controlling apparatus which is supplied electric current by a relay circuit for backing up and outputs an ignition control signal instructing ignition to an ignition unit in association with a detecting signal of a rotation sensor. Further, the apparatus stops output of the ignition control signal at the stopping time of the engine due to an open state of an ignition switch and prevents the ignition unit from being ignited earlier than desired at the starting time when the ignition switch is in a closed state again, by detecting the open and closed state of the ignition switch and by not outputting the ignition control signal when the ignition switch is in the open state.

2 Claims, 5 Drawing Sheets

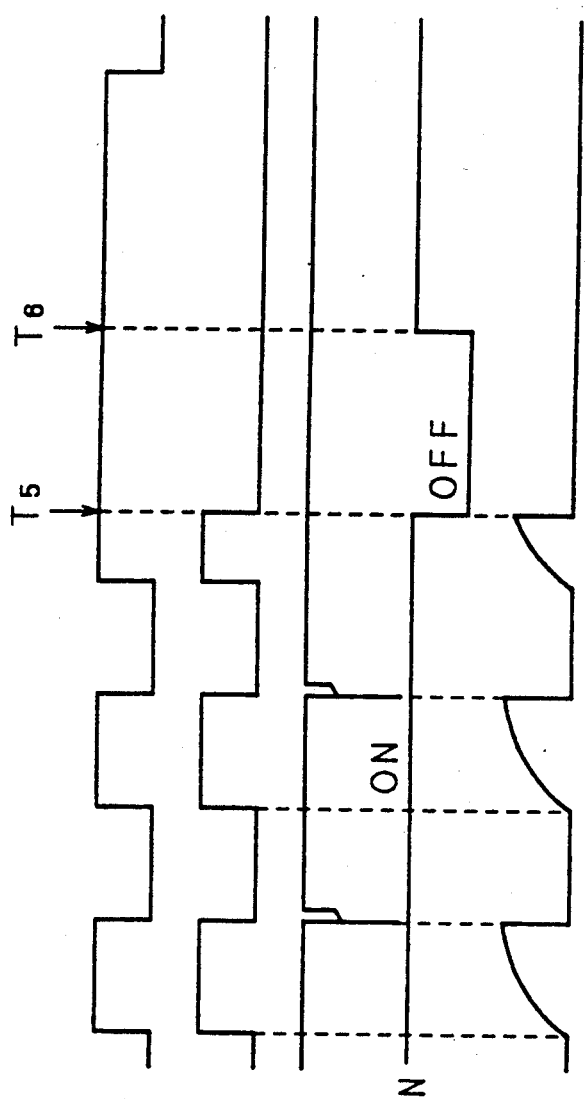

IGNITION TIMING CONTROLLING APPARATUS FOR INTERNAL COMBUSTION ENGINE

BACKGROUND OF THE INVENTION

1. Field of the Invention

This invention relates to an ignition timing controlling apparatus of an internal combustion engine, especially to ignition timing controlling apparatus which is improved in starting characteristic of the internal combustion engine.

2. Description of Related Art

FIG. 1 is a block diagram showing a construction of a conventional ignition timing controlling apparatus. In the figure, reference numeral 5 is a load sensor such as a boost sensor or the like which detects boost pressure of the inside of the intake manifold of an engine. The load sensor 5 detects load of the engine. The load sensor 5 is connected to an input interface (hereinafter to be called as input I/F) 6 together with a rotation sensor 4 which detects the number of the rotations of a crank shaft (or a cam shaft) of the engine and the referential position of a rotational angle thereof (hereinafter to be called as a crank angle). The input I/F 6 is connected to a microprocessor unit (hereinafter to be called MPU) 7 through a bus. Still more, the MPU 7 is connected to a ROM 8 which stores target ignition timing data and the like wherein control program, the number of rotations and load are made to be set as parammeters, to a RAM 9 which stores various kinds of control information, and to an output interface (hereinafter to be called as output I/F) 10. The MPU 7 reads out the target ignition timing data stored in the ROM 8 as parameters being the number of rotations and load, and calculates the target ignition timing on the basis of the read out target ignition timing data. The MPU 7 calculates the detected period according to the referential position of the crank angle detected at the rotation sensor 4, and calculates the time required for ignition from the referential position on the basis of the calculated period, detected referential position and calculated target ignition timing. When the rotation sensor 4 detects the referential position, the MPU 7 outputs an ignition control signal which instructs the ignition of the engine to the output I/F 10 through a bus after the calculated time has passed. An ignition control unit 11 is constituted by above mentioned input I/F 6, MPU 7, ROM 8, RAM 9 and output I/F 10.

The output I/F 10 is connected to a base of an ignition unit 12 employing an emitter-grounded transistor. The collector of the ignition unit 12 is connected to one end of the primary coil of an ignition coil 13. One end of the secondary coil of the ignition coil 13 is connected to an ignition plug (not shown). The ignition unit 12 switches on/off the electric current to the primary coil with the use of the ignition control signal. The other end of the primary coil is batch-connected to the other end of the secondary coil and one end of an ignition switch 14. The one end of the ignition switch 14 is also connected to the ignition control unit 11. The other end of the ignition switch 14 is connected to positive electrode of a battery 16 whose negative electrode is grounded. The ignition switch 14 switches on/off the electric current supplied from the battery 16. And the positive electrode of the battery 16 is connected to one end of a control relay 15 whose other end is connected to the ignition control unit 11. The control relay 15 is used for backing up the electric source of the ignition control unit 11. When electric source voltage $V_B$ is given to the ignition control unit 11 through the ignition switch 14, a control signal is given to the control relay 15 from the MPU 7 through the output I/F 10, thereby the control relay 15 is on. When the ignition switch 14 is off, and the MPU 7 completes the predetermined calculation, the control relay 15 is off by the control signal indicating the completion thereof. In other words, at the time when the ignition switch 14 is off, the MPU 7 sometimes has not yet completed the internal operation. Accordingly, the MPU 7 is required to be supplied electric source voltage $V_B$ until it completes the internal operation, and that is why the control relay 15 is provided.

FIG. 2 is a drawing showing operational waveforms of respective parts of the ignition timing controlling appartus shown in FIG. 1. In addition, in order to explain simply, the case where the ignition control signal is outputted in synchronism with the detected signal of the rotation sensor 4 is taken as an example here.

The conventional ignition timing controlling apparatus of the internal combustion engine is constituted as the above. When the ignition switch 14 is on at the time of starting, the electric source voltage $V_B$ from the battery 16 is supplied to the ignition control unit 11 through the ignition switch 14, following the route indicated by "a" in FIG. 1 which passes the ignition switch 14. After the electric source voltage $V_B$ being supplied, the MPU 7 makes the control relay 15 operate and supplies the electric source voltage $V_B$ to the ignition control unit 11, following the route indicated by "b". Accordingly, once the ignition switch 14 is on, the supply of the electric source voltage $V_B$ is to be continued by the control relay 15 even when the ignition switch is off thereafter. In this way, the electric source supply to the ignition control unit 11 is backed up.

An ignition control signal as shown in FIG. 2(b) is outputted in synchronism with the detecting signal of the rotation sensor 4 shown in FIG. 2(a). At the leading edge of the above mentioned ignition control signal, high voltage is generated at the secondary coil, thereby, ignition of the engine is carried out. The leading edge of aforesaid detecting signal becomes the referential position of the crank angle. The electric source voltage $V_B$ is supplied to the ignition control unit 11 through the control relay 15 and the electric source is supplied to the rotation sensor 4 from the ignition control unit 11, even if the ignition switch 14 is off when the detecting signal is "H" level at the time of $T_1$, thereby the engine being stopped. Therefore, the output signal of the rotation sensor 4 is continued to be outputted at "H" level as it is, and the ignition control signal in FIG. 2(b) stops with the ignition coil 13 being in the close state. Hereupon if the ignition coil 13 is continued to be on, the problem is created that the ignition coil will be burning and so on. So a control for shutting off supplying electric current to the ignition coil 13 is carried out after the time t has passed since the start of the supply. When the ignition switch 14 is on again at the time $T_2$, that is, before shutting off supplying electric current, the ignition control signal changes to "L" level at the time $T_3$ after time t has passed since the start of the supply, thereby ignition of the engine is carried out at the ignition timing $T_3$ whose rotational angle advances more than the ignition timing $T_4$ which originally is the timing to be desirably ignited.

The ignition timing controlling apparatus of the internal combustion engine as afore described has a problem that the engine starts earlier than desired when the ignition switch 14 is on again to start the engine at the time of engine stop due to the open-state of the ignition switch 14.

SUMMARY OF THE INVENTION

This invention has been devised to solve the conventional problems as above described. The primary object of the invention is to provide an ignition timing controlling apparatus of an internal combustion engine which is capable of preventing the generation of ignition earlier than desired when an ignition switch is on just after being off in order to give a good starting characteristic, by detecting the close and open state of the ignition switch and by not outputting an ignition control signal when the switch is off, in the apparatus which has a backing up electric source and outputs the ignition control signal even when the ignition switch is off.

The above and further objects and features of the invention will more fully be apparent from the following detailed description with accompanying drawings.

BRIEF DESCRIPTION OF THE DRAWINGS

FIGS. 4(a) through 6(e) show operational waveforms of respective parts of the apparatus of the invention.

DESCRIPTION OF THE PREFERRED EMBODIMENTS

Figure 1:
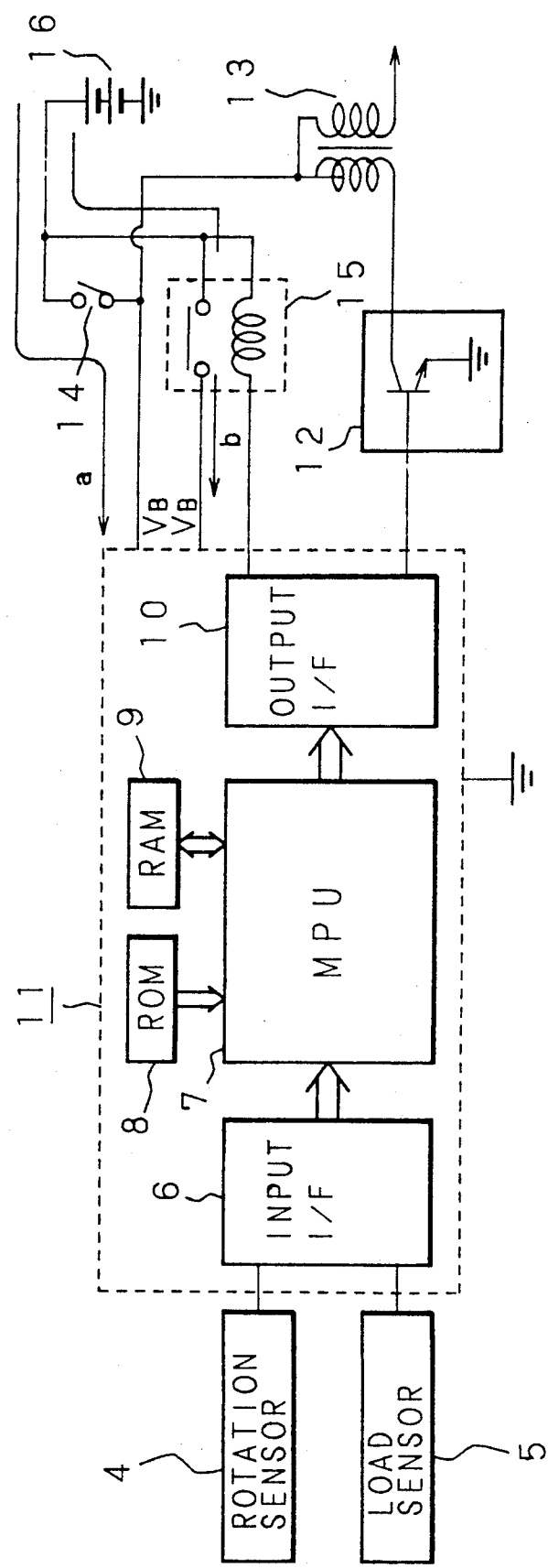
FIG. 1 is a block diagram showing a construction of a conventional ignition timing controlling apparatus.
Figure 2:
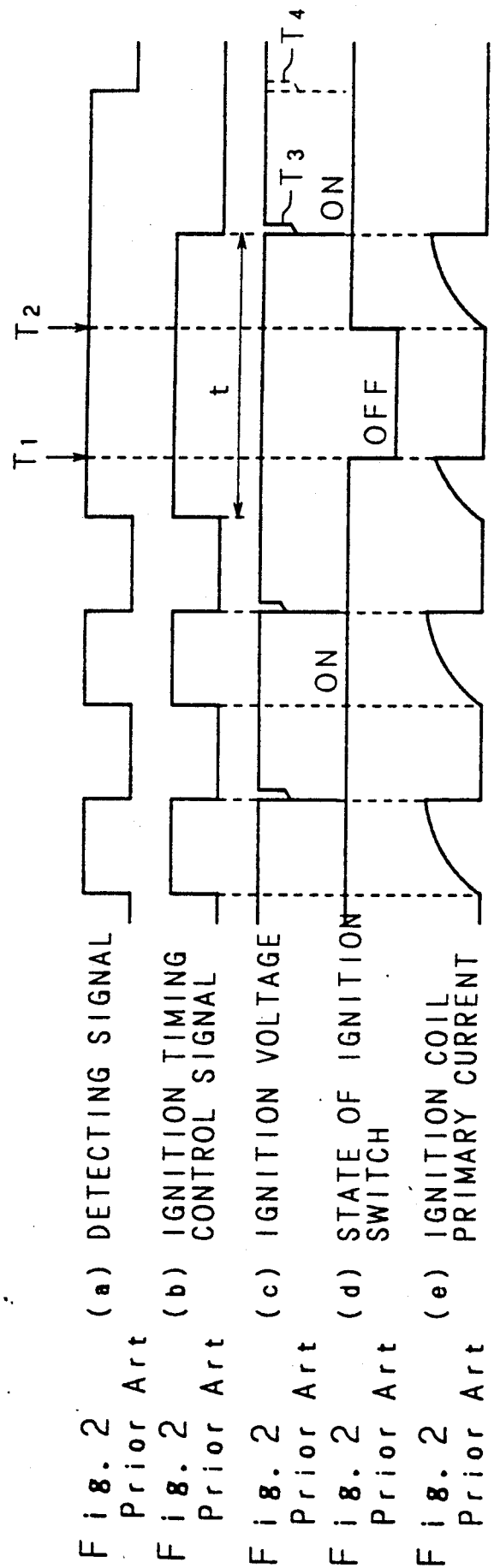
FIGS. 2(a) through 2(e) show operational waveforms of respective parts of the conventional apparatus.
Figure 3:
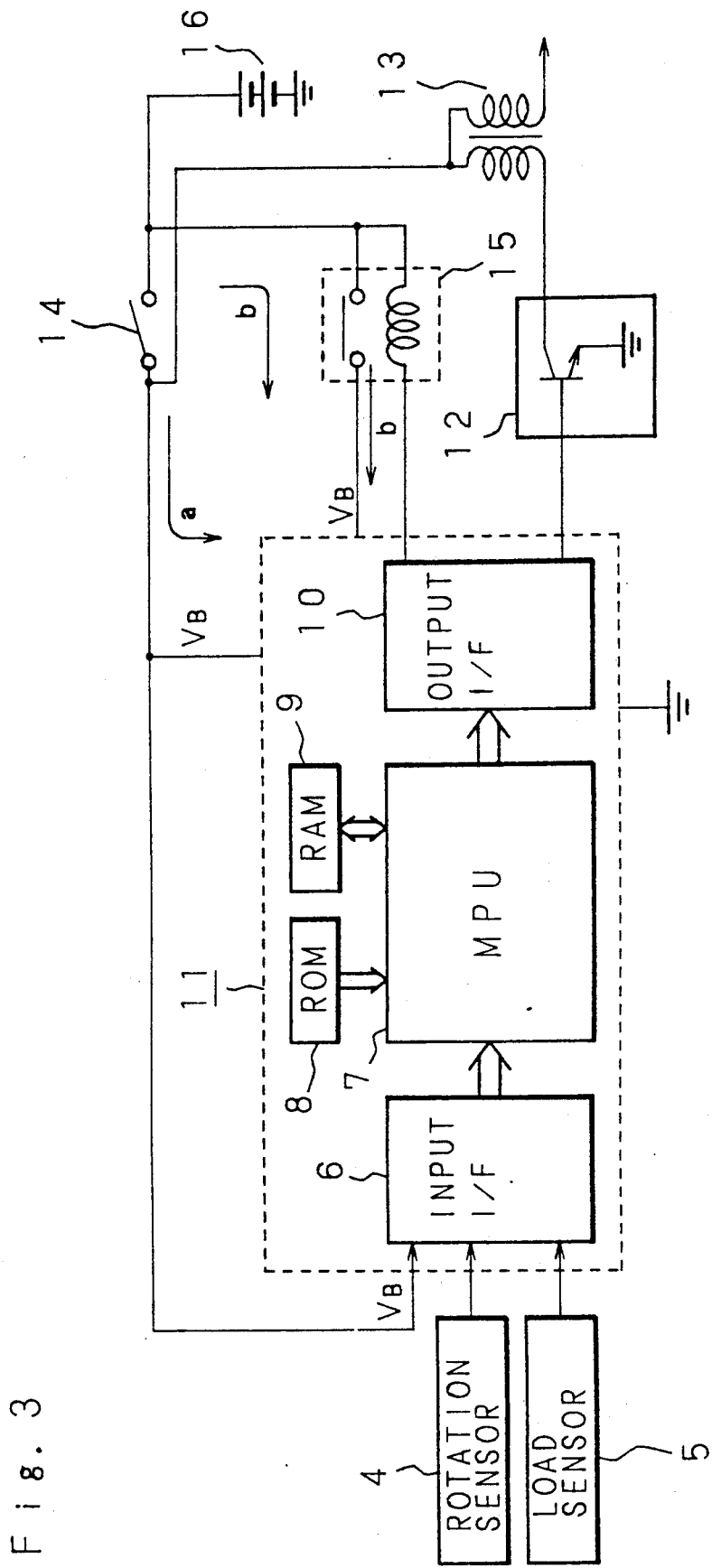
FIG. 3 is a block diagram showing a construction of ignition timing controlling apparatus of the invention.

FIG. 3 is a block diagram showing a construction of ignition timing controlling apparatus of the present invention. In the figure, reference numeral 5 is a load sensor such as a boost sensor or the like which detects boost pressure of the inside of the intake manifold of an engine. The load sensor 5 detects load of the engine. The load sensor 5 is connected to an input interface (hereinafter to be called as input I/F) 6 together with a rotation sensor 4 which detects the number of rotations of a crank shaft (or a cam shaft) of the engine and the referential position of a rotational angle thereof (hereinafter to be called as a crank angle). The input I/F 6 is connected to a microprocessor unit (hereinafter to be called MPU) 7 through a bus. Still more, the MPU 7 is connected to a ROM 8 which stores target ignition timing data and the like wherein control program, the number of rotations and load are made to be set as parameters, to a RAM 9 which stores various kinds of control information, and to an output interface (hereinafter to be called as output I/F) 10. The MPU 7 reads out the target ignition timing data stored in the ROM 8 as parameters being the number of rotations and load, and calculates the target ignition timing on the basis of the read-out target ignition timing data. The MPU 7 calculates the detected period according to the referential position of the crank angle detected at the rotation sensor 4, and calculates the time required for ignition from the referential position on the basis of the calculated period, detected referential position and calculated target ignition timing. When the rotation sensor 4 detects the referential position, the MPU 7 outputs an ignition control signal which instructs the ignition of the engine to the output I/F 10 through a bus after the calculated time has passed. The ignition control unit 11 is constituted by above mentioned input I/F 6, MPU 7, ROM 8, RAM 9 and output I/F 10.

The output I/F 10 is connected to a base of an ignition unit 12 employing an emitter-grounded transistor. The collector of the ignition unit 12 is connected to one end of the primary coil of the ignition coil 13. One end of the secondary coil of the ignition coil 13 is connected to an ignition plug (not shown). The ignition unit 12 switches on/off the electric current to the primary coil with the use of the ignition control signal. The other end of the primary coil is batch-connected to the other end of the secondary coil and one end of the ignition switch 14. And one end of the ignition switch 14 is also connected to the ignition control unit 11 and the input I/F 6. The MPU 7 receives electric source voltage $V_B$ through the input I/F 6, examines the level thereof, and judges the close and open state of the ignition switch 14. The other end of the ignition switch 14 is connected to the positive electrode of a battery 16 whose negative electrode is grounded, thereby the ignition switch 14 switches on/off the electric power supplied from the battery 16. And the positive electrode of the battery 16 is connected to one end of a control relay 15 whose other end is connected to the ignition control unit 11. The control relay 15 is used for backig up the electric source of the MPU 7. When the electric source voltage $V_B$ is given to the MPU 7 through the ignition switch 14, a control signal is given to the control relay 15 from the MPU 7, thereby the control relay 15 being on. Then the ignition switch 14 is off. When the MPU 7 completes the predetermined operation, the control relay 15 is off by the control signal indicating the completion of the operation. That is, as the MPU 7 has not completed the inner operation even when the ignition switch is off, the control relay 15 is provided to supply electric source voltage $V_B$ to the MPU 7 until the completion of the inner operation.

Figure 4:
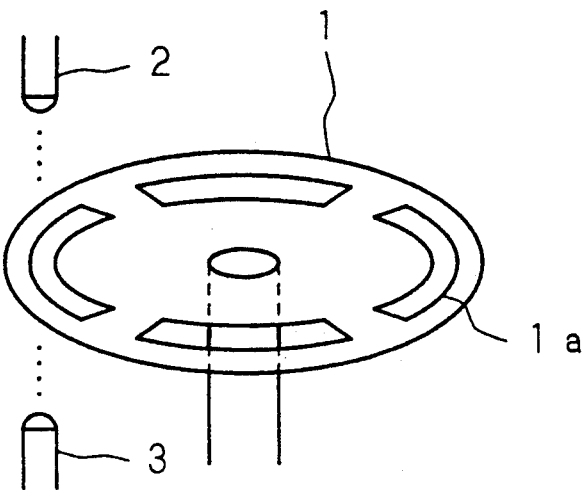
FIG. 4 is a schematic diagram of a rotation sensor.

FIG. 4 is a schematic perspective view showing a construction of the rotation sensor 4. In the figure, reference numeral 1 is a disc provided with four windows 1a having equal intervals from the one to the next in the peripheral direction, the aforesaid disc 1 being installed on the cam shaft of the engine. A light emitting diode 2 and a photo transistor 3 are put against each other with the disc 1 being interposed therebetween. The disc 1 transmits or shuts off the light emitted from the light emitting diode 2 toward the photo transistor 3 so as to generate pulse signals. By counting the pulse signals, the rotation sensor 4 is capable of obtaining the rotational angle and the number of rotations of the crank shaft.

Next, explanation will be given on operation of the ignition timing controlling apparatus of the invention.

Figure 5:
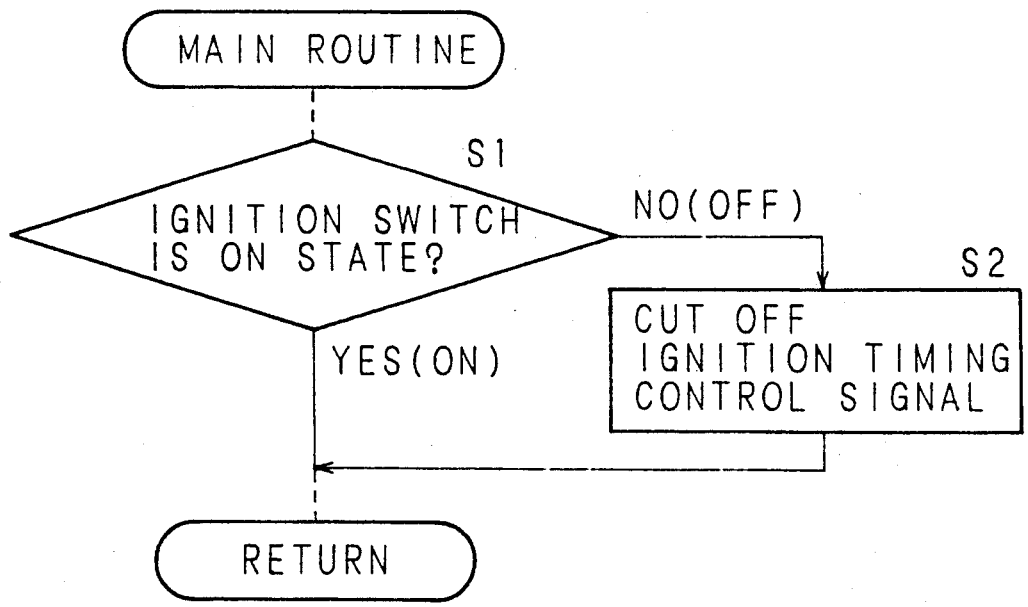
FIG. 5 is a flow chart of operation of the apparatus of the invention.

FIG. 5 is a flow chart showing a content of operation of the ignition timing controlling apparatus of the invention shown in FIG. 3. FIG. 6 is a drawing of operational waveforms of respective parts of the apparatus of the invention.

In the ignition timing controlling apparatus of the internal combustion engine as above constructed, when the ignition switch 14 is on at the time of starting, the electric source voltage $V_B$ from the battery 16 is supplied to the ignition control unit 11 through the ignition switch 14, following the route indicated by "a" in FIG. 3 which passes the ignition switch 14. After the electric source voltage being supplied, the MPU 7 makes the control relay 15 operate and supplies the electric source voltage $V_B$ to the ignition control unit 11, following the route indicated by "b". Accordingly, once the ignition switch 14 is on, the supply of the electric source voltage $V_B$ is to be continued by the control relay 15 even when the ignition switch is off thereafter. In this way, the electric source supply to the ignition control unit 11 is backed up.

An ignition control signal as shown in FIG. 6(b) is outputted in synchronism with a detecting signal of the rotation sensor 4 shown in FIG. 6(a). At the leading edge of the above mentioned ignition control signal, the ignition unit 12 is off and high voltage is generated at the secondary coil, thereby ignition of the engine is carried out. And as above described, the MPU 7 identifies the level of the electric source voltage $V_B$, thereby detecting on/off of the ignition switch 14. In Step S1 shown in FIG. 5, on/off of the ignition switch 14 is identified. When the ignition switch 14 is off, processing advances to Step S2, the ignition control signal being forced to be cut off. Immediately after it is detected that the ignition switch 14 is off at the time of $T_5$ shown in FIG. 6(a), the ignition control signal shown in FIG. 6(b) is forced to be off, the ignition switch 14 being on at the time of $T_6$ for re-starting. As the ignition control signal is not outputted at the time of re-starting, ignition earlier than desired can be previously prevented.

The invention, as described above, is provided with means for detecting on/off of the ignition switch, and when this means detects the open state of aforesaid ignition switch, the ignition control of aforesaid engine is to be stopped. Accordingly, the invention prevents the ignition earlier than desired at the starting time which is possible to occur when the ignition switch is on again at the time of the engine stop due to the open state of the ignition switch, whereby assuring a good starting characteristic.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An ignition timing controlling apparatus for an internal combustion engine, comprising:

switching means for switching on and off an electric current for igniting said internal combustion engine;

state detecting means for detecting closed and open states of said switching means;

control means for outputting an ignition control signal which controls ignition timing of said internal combustion engine;

means for supplying said electric current to said control means when said switching means is in a closed state, and for shutting off said electric current being supplied to said control means after a predetermined duration by the ignition control signal from said control means when said switching means is in an open state; and means for stopping the output of said ignition control signal from said control means when said state detecting means detects the open state of said switching means.

2. An ignition timing controlling apparatus as set forth in claim 1, further comprising, rotational angle detecting means for detecting a reference position of a rotational angle of said internal combustion engine, said control means outputting said ignition control signal at a target ignition timing related to the detected reference position of the rotational angle.

* * * * *